(12) United States Patent
Kuijper

(10) Patent No.: US 8,339,912 B2
(45) Date of Patent: Dec. 25, 2012

(54) RECORD CARRIER AS WELL AS AN APPARATUS AND METHOD FOR APPLYING IMAGE DATA AS A VISUALLY DETECTABLE PATTERN AT AN OPTICAL RECORD CARRIER

(75) Inventor: Maarten Kuijper, Taipei (TW)

(73) Assignee: Lite-On IT Corporation, Taipei (TW)

(*) Notice: Subject to any disclaimer, the term of this patent is extended or adjusted under 35 U.S.C. 154(b) by 752 days.

(21) Appl. No.: 12/543,214

(22) Filed: Aug. 18, 2009

(65) Prior Publication Data
US 2010/0067334 A1 Mar. 18, 2010

Related U.S. Application Data

(60) Provisional application No. 61/097,480, filed on Sep. 16, 2008.

(51) Int. Cl.
*G11B 15/52* (2006.01)

(52) U.S. Cl. .................... 369/47.51; 369/53.26

(58) Field of Classification Search .................. None
See application file for complete search history.

(56) References Cited

U.S. PATENT DOCUMENTS

| | | | | |
|---|---|---|---|---|
| 7,452,048 B2 * | 11/2008 | Silverbrook | ..................... | 347/16 |
| 2009/0103423 A1 * | 4/2009 | Kondo et al. | ............ | 369/112.23 |

* cited by examiner

*Primary Examiner* — Paul Huber
(74) *Attorney, Agent, or Firm* — McClure, Qualey & Rodack, LLP

(57) ABSTRACT

A record carrier is described comprising a zone with a visually detectable pattern composed of pattern elements arranged along at least one track. The pattern elements comprise a marked zone having an optical property deviating from a background, the marked zones having a width Wm transverse to the track direction and a length Lm along the track direction, wherein at least two or more pattern elements have a marked zone with a mutually different width Wm.

In this way, an increased visibility of the visual pattern is achieved. Likewise a method and an apparatus for recording an optical record carrier is included.

8 Claims, 18 Drawing Sheets

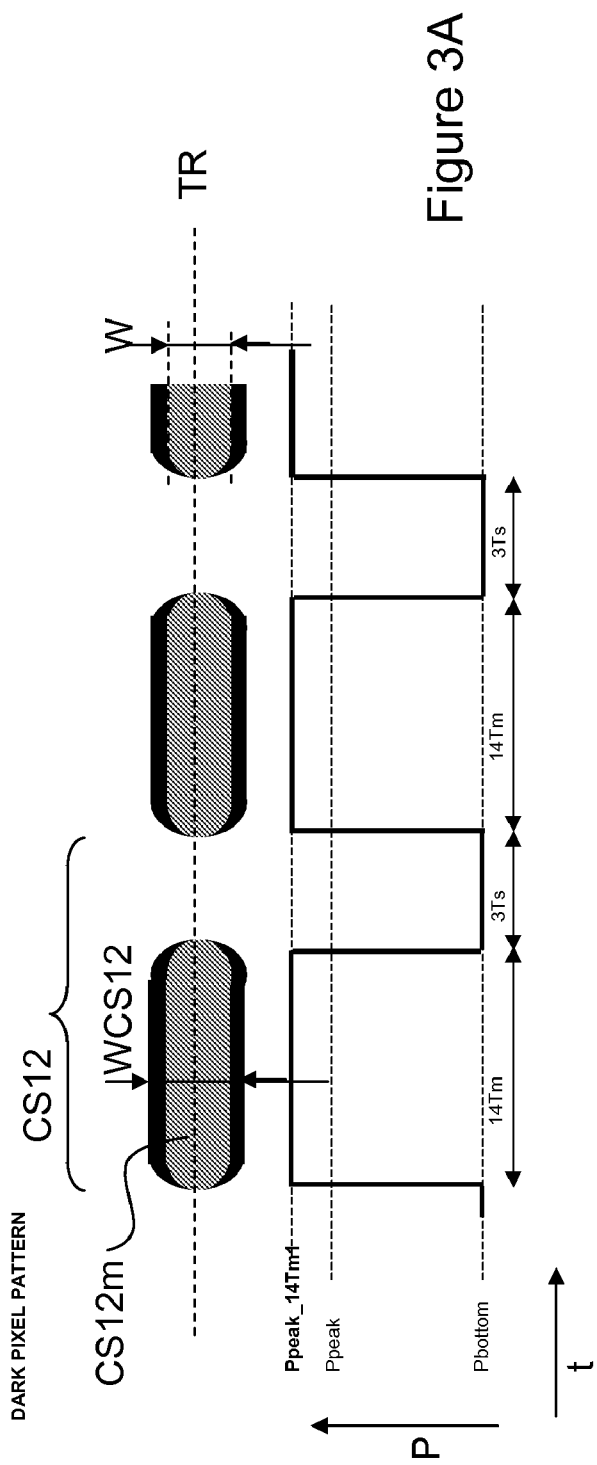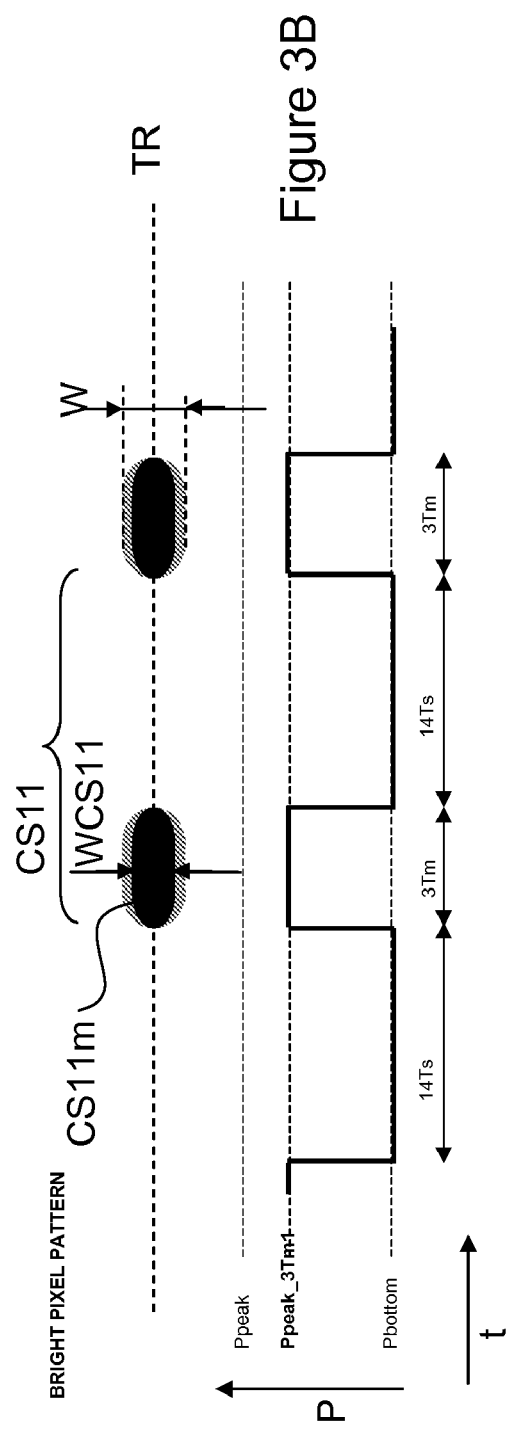

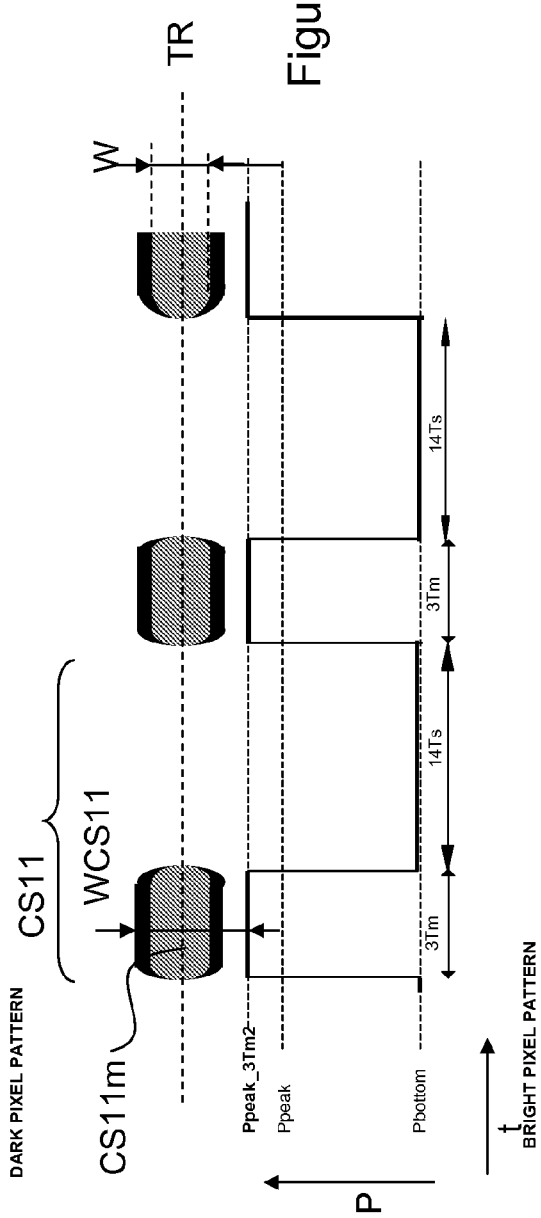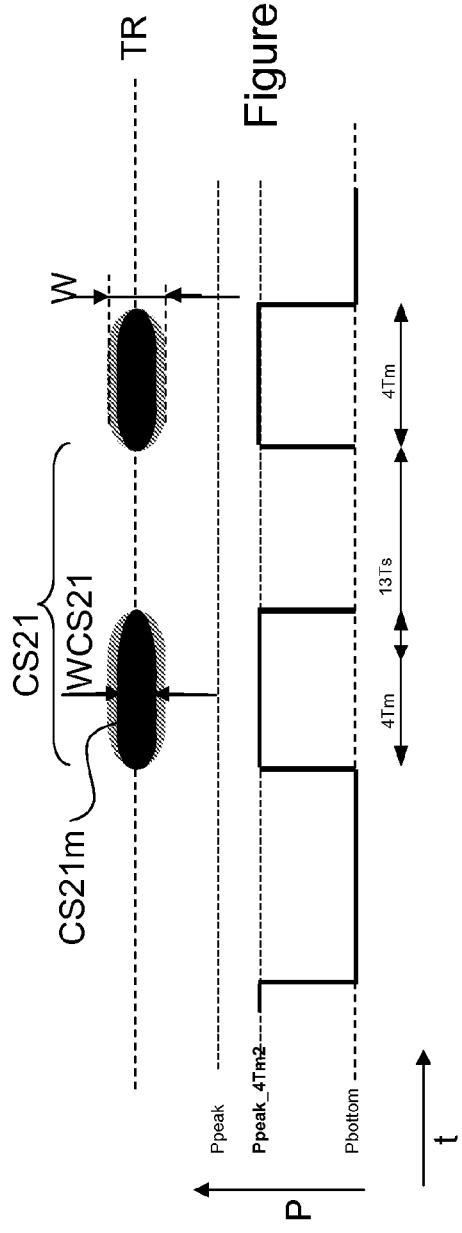

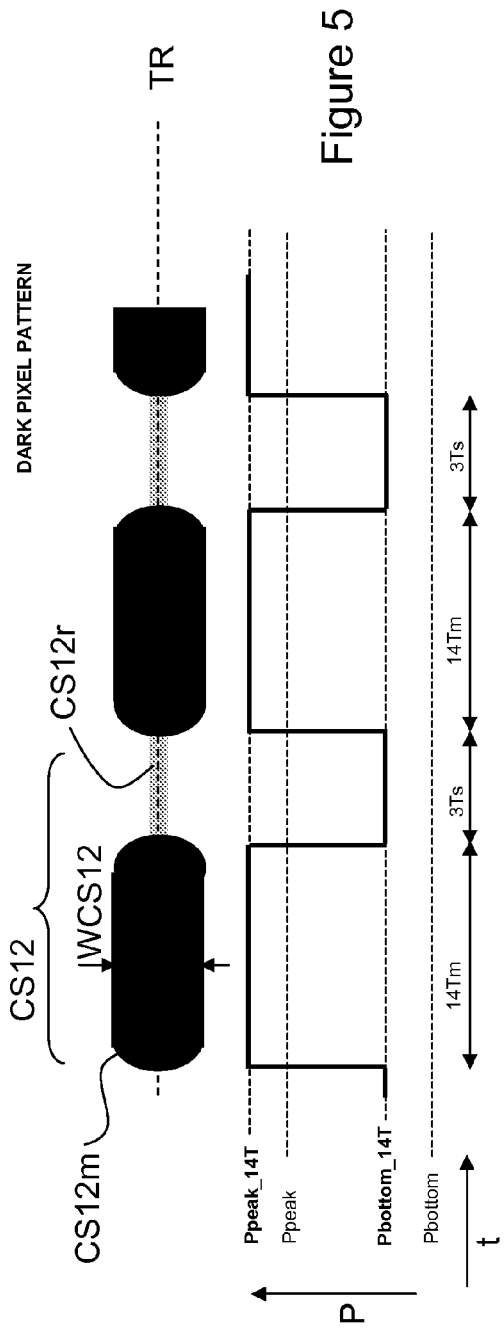
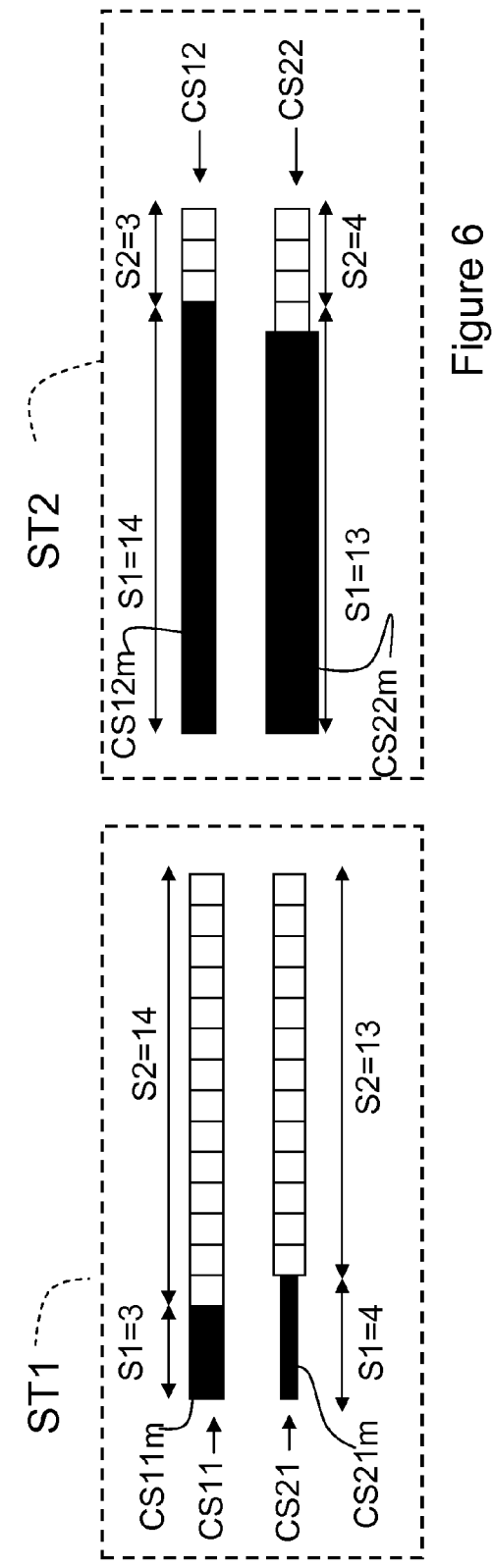

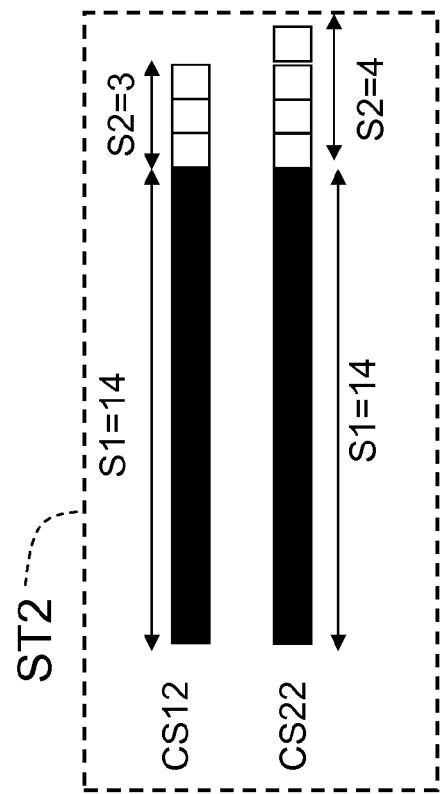
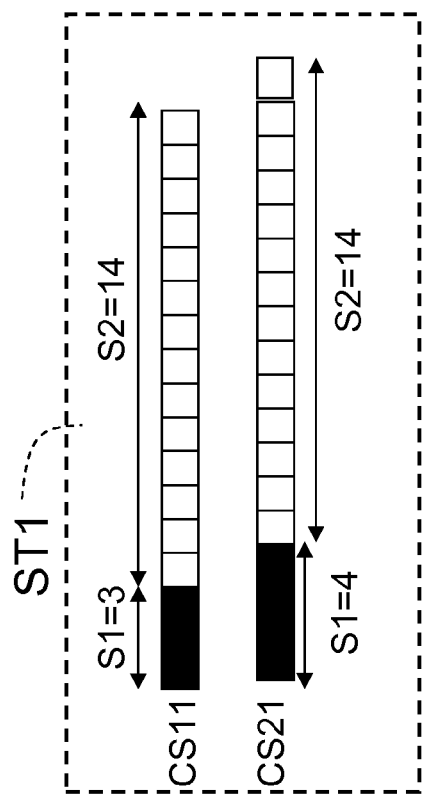
Figure 10

Figure 11A

| primary data | codeword | Contrast enhancement code |  |  |  |  |  |  |  |
|---|---|---|---|---|---|---|---|---|---|
| | | b7 | b6 | b5 | b4 | b3 | b2 | b1 | b0 |
| 0x0 | 0x05 | 0 | 0 | 0 | 0 | 0 | 1 | 0 | 1 |
| 0x1 | 0x09 | 0 | 0 | 0 | 0 | 1 | 0 | 0 | 1 |
| 0x2 | 0x0A | 0 | 0 | 0 | 0 | 1 | 0 | 1 | 0 |
| 0x3 | 0x11 | 0 | 0 | 0 | 1 | 0 | 0 | 0 | 1 |
| 0x4 | 0x12 | 0 | 0 | 0 | 1 | 0 | 0 | 1 | 0 |
| 0x5 | 0x14 | 0 | 0 | 0 | 1 | 0 | 1 | 0 | 0 |
| 0x6 | 0x21 | 0 | 0 | 1 | 0 | 0 | 0 | 0 | 1 |
| 0x7 | 0x22 | 0 | 0 | 1 | 0 | 0 | 0 | 1 | 0 |
| 0x8 | 0x24 | 0 | 0 | 1 | 0 | 0 | 1 | 0 | 0 |
| 0x9 | 0x28 | 0 | 0 | 1 | 0 | 1 | 0 | 0 | 0 |
| 0xA | 0x41 | 0 | 1 | 0 | 0 | 0 | 0 | 0 | 1 |
| 0xB | 0x42 | 0 | 1 | 0 | 0 | 0 | 0 | 1 | 0 |
| 0xC | 0x44 | 0 | 1 | 0 | 0 | 0 | 1 | 0 | 0 |
| 0xD | 0x48 | 0 | 1 | 0 | 0 | 1 | 0 | 0 | 0 |
| 0xE | 0x50 | 0 | 1 | 0 | 1 | 0 | 0 | 0 | 0 |
| 0xF | 0x18 | 0 | 0 | 0 | 1 | 1 | 0 | 0 | 0 |

| Primary data | Contrast Code word | Contrast code bits | | | | | | | | | | | |
|---|---|---|---|---|---|---|---|---|---|---|---|---|---|
| 0x00 | 0x0009 | 0 | 0 | 0 | 0 | 0 | 0 | 0 | 0 | 1 | 0 | 0 | 1 |
| 0x01 | 0x0011 | 0 | 0 | 0 | 0 | 0 | 0 | 0 | 1 | 0 | 0 | 0 | 1 |
| 0x02 | 0x0012 | 0 | 0 | 0 | 0 | 0 | 0 | 0 | 1 | 0 | 0 | 1 | 0 |
| 0x03 | 0x0021 | 0 | 0 | 0 | 0 | 0 | 0 | 1 | 0 | 0 | 0 | 0 | 1 |
| 0x04 | 0x0022 | 0 | 0 | 0 | 0 | 0 | 0 | 1 | 0 | 0 | 0 | 1 | 0 |
| 0x05 | 0x0024 | 0 | 0 | 0 | 0 | 0 | 0 | 1 | 0 | 0 | 1 | 0 | 0 |
| 0x06 | 0x0041 | 0 | 0 | 0 | 0 | 0 | 1 | 0 | 0 | 0 | 0 | 0 | 1 |
| 0x07 | 0x0042 | 0 | 0 | 0 | 0 | 0 | 1 | 0 | 0 | 0 | 0 | 1 | 0 |
| 0x08 | 0x0044 | 0 | 0 | 0 | 0 | 0 | 1 | 0 | 0 | 0 | 1 | 0 | 0 |
| 0x09 | 0x0048 | 0 | 0 | 0 | 0 | 0 | 1 | 0 | 0 | 1 | 0 | 0 | 0 |
| 0x0A | 0x0081 | 0 | 0 | 0 | 0 | 1 | 0 | 0 | 0 | 0 | 0 | 0 | 1 |
| 0x0B | 0x0082 | 0 | 0 | 0 | 0 | 1 | 0 | 0 | 0 | 0 | 0 | 1 | 0 |
| 0x0C | 0x0084 | 0 | 0 | 0 | 0 | 1 | 0 | 0 | 0 | 0 | 1 | 0 | 0 |
| 0x0D | 0x0088 | 0 | 0 | 0 | 0 | 1 | 0 | 0 | 0 | 1 | 0 | 0 | 0 |
| 0x0E | 0x0090 | 0 | 0 | 0 | 0 | 1 | 0 | 0 | 1 | 0 | 0 | 0 | 0 |
| 0x0F | 0x0101 | 0 | 0 | 0 | 1 | 0 | 0 | 0 | 0 | 0 | 0 | 0 | 1 |

Figure 11B

| Primary data | Contrast Code word | Contrast code bits | | | | | | | | | | | | | | |
|---|---|---|---|---|---|---|---|---|---|---|---|---|---|---|---|---|
| 0x00 | 0x0021 | 0 | 0 | 0 | 0 | 0 | 0 | 0 | 0 | 1 | 0 | 0 | 0 | 0 | 1 |
| 0x01 | 0x0041 | 0 | 0 | 0 | 0 | 0 | 0 | 0 | 1 | 0 | 0 | 0 | 0 | 0 | 1 |
| 0x02 | 0x0042 | 0 | 0 | 0 | 0 | 0 | 0 | 0 | 1 | 0 | 0 | 0 | 0 | 1 | 0 |
| 0x03 | 0x0081 | 0 | 0 | 0 | 0 | 0 | 0 | 1 | 0 | 0 | 0 | 0 | 0 | 0 | 1 |
| 0x04 | 0x0082 | 0 | 0 | 0 | 0 | 0 | 0 | 1 | 0 | 0 | 0 | 0 | 0 | 1 | 0 |
| 0x05 | 0x0084 | 0 | 0 | 0 | 0 | 0 | 0 | 1 | 0 | 0 | 0 | 0 | 1 | 0 | 0 |
| 0x06 | 0x0101 | 0 | 0 | 0 | 0 | 0 | 1 | 0 | 0 | 0 | 0 | 0 | 0 | 0 | 1 |
| 0x07 | 0x0102 | 0 | 0 | 0 | 0 | 0 | 1 | 0 | 0 | 0 | 0 | 0 | 0 | 1 | 0 |
| 0x08 | 0x0104 | 0 | 0 | 0 | 0 | 0 | 1 | 0 | 0 | 0 | 0 | 0 | 1 | 0 | 0 |
| 0x09 | 0x0108 | 0 | 0 | 0 | 0 | 0 | 1 | 0 | 0 | 0 | 0 | 1 | 0 | 0 | 0 |
| 0x0A | 0x0201 | 0 | 0 | 0 | 0 | 1 | 0 | 0 | 0 | 0 | 0 | 0 | 0 | 0 | 1 |
| 0x0B | 0x0202 | 0 | 0 | 0 | 0 | 1 | 0 | 0 | 0 | 0 | 0 | 0 | 0 | 1 | 0 |
| 0x0C | 0x0204 | 0 | 0 | 0 | 0 | 1 | 0 | 0 | 0 | 0 | 0 | 0 | 1 | 0 | 0 |
| 0x0D | 0x0208 | 0 | 0 | 0 | 0 | 1 | 0 | 0 | 0 | 0 | 0 | 1 | 0 | 0 | 0 |
| 0x0E | 0x0210 | 0 | 0 | 0 | 0 | 1 | 0 | 0 | 0 | 0 | 1 | 0 | 0 | 0 | 0 |
| 0x0F | 0x0401 | 0 | 0 | 0 | 1 | 0 | 0 | 0 | 0 | 0 | 0 | 0 | 0 | 0 | 1 |

Figure 11C

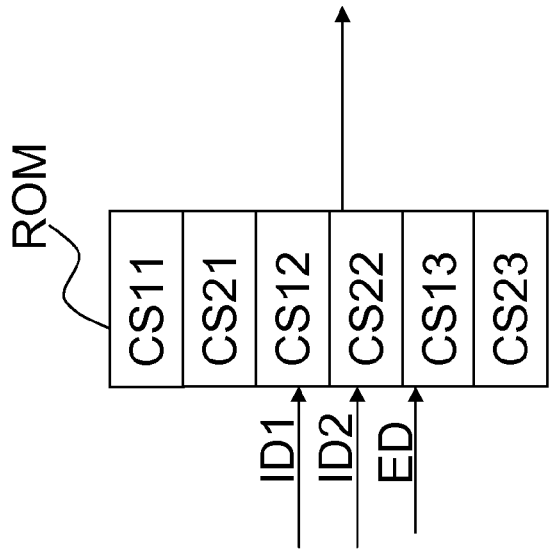
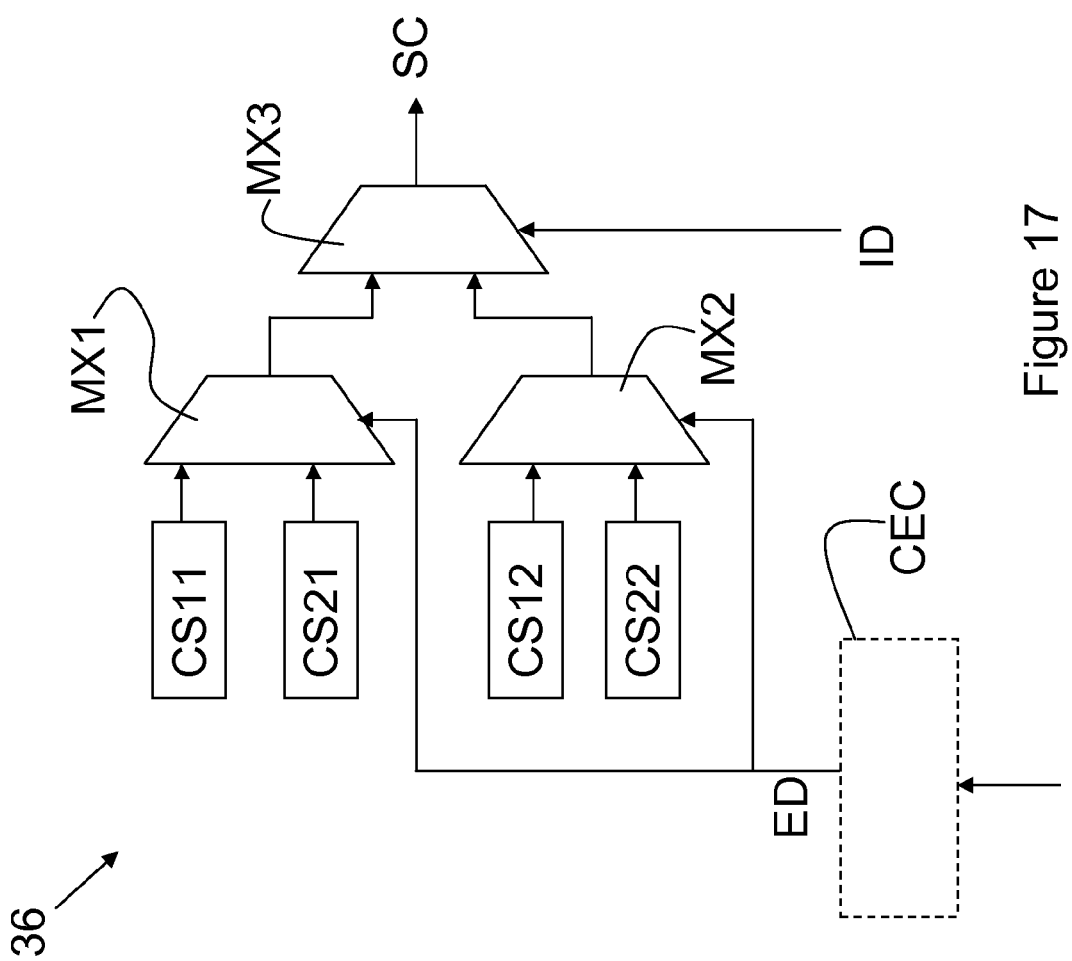
Figure 18
Figure 17

RECORD CARRIER AS WELL AS AN APPARATUS AND METHOD FOR APPLYING IMAGE DATA AS A VISUALLY DETECTABLE PATTERN AT AN OPTICAL RECORD CARRIER

CROSS REFERENCE TO RELATED APPLICATION

This application claims the benefit of priority under 35 U.S.C. Section 119 from U.S. Provisional Patent Application Ser. No. 61/097,480, filed on Sep. 16, 2008.

BACKGROUND OF THE INVENTION

1. Field of the Invention

The present invention relates to a method of applying image data as a visually detectable pattern at an optical record carrier.

The present invention further relates to an apparatus for applying image data as a visually detectable pattern at an optical record carrier.

The present invention still further relates to an optical record carrier having applied thereon image data in the form of a visually detectable pattern.

2. Related Art

A visually detectable pattern comprises for example a logo, a sequence of characters or a combination thereof. The visually detectable pattern is printed at a resolution suitable for detection by the human visual system. For example the visually detectable pattern may be printed at a resolution of 1 to several hundreds dots per $mm^2$ (as compared to computer readable data, which is stored at the record carrier at a resolution in the order of several $Mbits/mm^2$). In this way, a user does not need a reading device to recognize the contents of the optical disk, but a simple visual inspection suffices. Such a visually detectable pattern can also serve as a means to detect the authenticity of the record carrier.

A method and a device for providing a watermark at a record carrier is disclosed in EP 1,710,896. According to the method described therein, a parameter of the channel code is controlled to introduce a predetermined run-length distribution. In particular, said parameter is the choice of the merging bits used in the channel code. Introduction of the run-length distribution results in a visually detectable pattern. The contrast of this pattern is weak, however. Moreover, the presence of data embedded in the visually detectable pattern diminishes the visibility of the image data represented by the pattern. There is a need to apply a visually detectable pattern at an optical record carrier having an improved visibility.

SUMMARY OF THE INVENTION

According to a first aspect of the invention a record carrier is provided comprising a zone with a visually detectable pattern composed of pattern elements arranged along at least one track, the pattern elements comprising a marked zone having an optical property deviating from a background, the marked zones having a width Wm transverse to the track direction and a length Lm along the track direction, wherein two or more pattern elements have a marked zone with a mutually different width.

According to a second aspect of the invention there is further provided a method of writing a visually detectable pattern of pattern elements at a record carrier by targeting a modulated beam of radiation at the record carrier, comprising the step of selecting at least one pattern element from at least a first and a second pattern element, and writing the selected pattern element at the record carrier, wherein if the first pattern element is selected, the first pattern element is written with a first top radiation power Pt1 during a first relatively short time interval tm1 and with a first bottom radiation power Pb1 during a first relatively long time interval ts1, and if the second pattern element is selected, the second pattern element is written with a second top radiation power Pt2 during a second relatively long time interval tm2 and with a second bottom radiation power Pb2 during a second relatively short time interval ts2, wherein, when the first and the second pattern element are written at the same speed, Pt1>Pb1, Pt2>Pb2, tm1<ts1 and tm2>ts2, and at least Pt1 differs from Pt2 and/or Pb1 differs from Pb2.

According to a third aspect of the invention there is provided an apparatus for writing a visually detectable pattern of pattern elements at a record carrier comprising a facility for targeting a beam of radiation at a spot at a surface of the record carrier, a facility for causing a relative movement of the spot with respect to the surface of the record carrier, and a facility for controlling a power of the beam of radiation, comprising a selection facility for selecting a pattern element to be written from at least a first and a second pattern element, wherein the apparatus is arranged to write the first pattern element at a reference speed with a first top radiation power Pt1 during a first relatively short time interval tm1 and with a first bottom radiation power Pb1 during a first relatively long time interval ts1, and is arranged to write the second pattern element at the reference speed with a second top radiation power Pt2 during a second relatively long time interval tm2 and with a second bottom radiation power Pb2 during a second relatively short time interval ts2, wherein Pt1>Pb1, Pt2>Pb2, tm1<ts1 and tm2>ts2, and wherein at least Pt1 differs from Pt2 and/or Pb1 differs from Pb2.

In the known apparatus, the visually detectable pattern at the record carrier is created by run-length variations of the marked zones of the pattern elements. The marked zones have a fixed width in the order of 60% of the track-pitch. The present invention is based on the insight that variations in the width of the pattern elements may additionally be introduced to improve the visibility of the visually detectable pattern.

By the method and the apparatus according to the invention, a variation in the radiation power is introduced to control the width of the marked zones. In addition or alternatively the width of the marks may be controlled by varying a focus of the beam. In general, a defocusing of the radiation beam as such will result in a smaller peak-value of the power density of the spot, and therewith to a more narrow mark. However, in combination with an increased power, it may be used to increase the width of the mark.

It is noted that the length dimension of the marked zones is defined as the size of a marked zone in the direction of the track along which the marked zone is scanned and the width of a marked zone is defined as the size of a marked zone transverse to the track direction.

Applying width variations in the marked zones of the pattern elements is possible in various ways. In a first embodiment, the width of the marked zones is positively correlated to the length of the marked zones. Accordingly dark pixels are represented by pattern elements having relatively wide and relatively long marked zones, whereas bright pixels are represented by pattern elements having relatively narrow and relatively short marked zones.

When embedding data in the visually detectable pattern by length variations in the marked zones of the pattern elements, the presence of the embedded data may be cloaked in a second embodiment of the invention by compensating width variations. In other words, the embedded data may be represented by a pattern of relatively long but narrow elements and relatively short but wide elements. In this way the embedded data is machine readable, by detecting a length of the marked zones of the pattern elements, but the presence of the embedded data is less visible than in the case of a constant width of the pattern elements. An optimal cloaking of the embedded data is achieved when the width of the data elements is inversely proportional to their length.

In the previous description, it was presumed that the marked zone is relatively dark as compared to the background. Alternatively, the record carrier may comprise a medium of which the marked zone is relatively bright as compared to the background.

The visually detectable pattern may be applied at a side opposite to a side where the regular data is applied. It is attractive however that the visually detectable pattern is applied at the side of the record carrier that also accommodates the regular data, to facilitate that the visually detectable pattern can be applied by the same means as such regular data and without having to turn the record carrier.

In order to prevent that legacy drives, unaware of the visually detectable pattern, erroneously interpret the visually detectable pattern as data and the visually detectable pattern may be preceded by a buffer-in zone and succeeded by a buffer-out zone. Examples thereof are described in more detail in the Application P86018US00 filed by the same Applicant. Additionally or alternatively the measures described in P82008US00 with filing number U.S. 60/954,494. Therein the visually detectable pattern is arranged in a ring-shaped zone, while the primary data organizing system does not refer to this zone.

The optical record carrier may for example be an optical disc, e.g. one of the types CD-R, CD-RW, DVD+/−R, DVD+/−RW, BD-R, BD-RE, or HD-DVD. [DVD-RAM] Alternatively the optical record carrier may be another medium that can be read out with optical means, e.g. a credit card CD, provided that the data is arranged on such an optical record carrier as in an optical disc, i.e. spirally or concentrically arranged around a centre of rotation.

Various recording modes are possible at basic format level, e.g. disc at once, multi-session, sequential with or without logical overwrite and random.

BRIEF DESCRIPTION OF THE DRAWINGS

These and other aspects are described in more detail with reference to the drawing. Therein:

FIG. 3A, 3B illustrate a first aspect of a method according to the invention and a sequence of pattern elements obtained therewith, FIG. 4A, 4B illustrate a second aspect of a method according to the invention and a sequence of pattern elements obtained therewith, FIG. 5 illustrate a third aspect of a method according to the invention and a sequence of pattern elements obtained therewith, FIG. 6 shows a first and a second subset of pattern elements in a first embodiment of the record carrier, FIG. 10 shows a first and a second subset of pattern elements in a fifth embodiment of the record carrier, FIG. 11A shows a first embodiment of a contrast enhancement code, FIG. 11B shows a second embodiment of a contrast enhancement code, FIG. 11C shows a third embodiment of a contrast enhancement code, FIG. 17 shows a detail in a first embodiment of the apparatus of FIG. 16, FIG. 18 shows a detail in a second embodiment of the apparatus of FIG. 16.

DETAILED DESCRIPTION OF EMBODIMENTS

Figure 1:
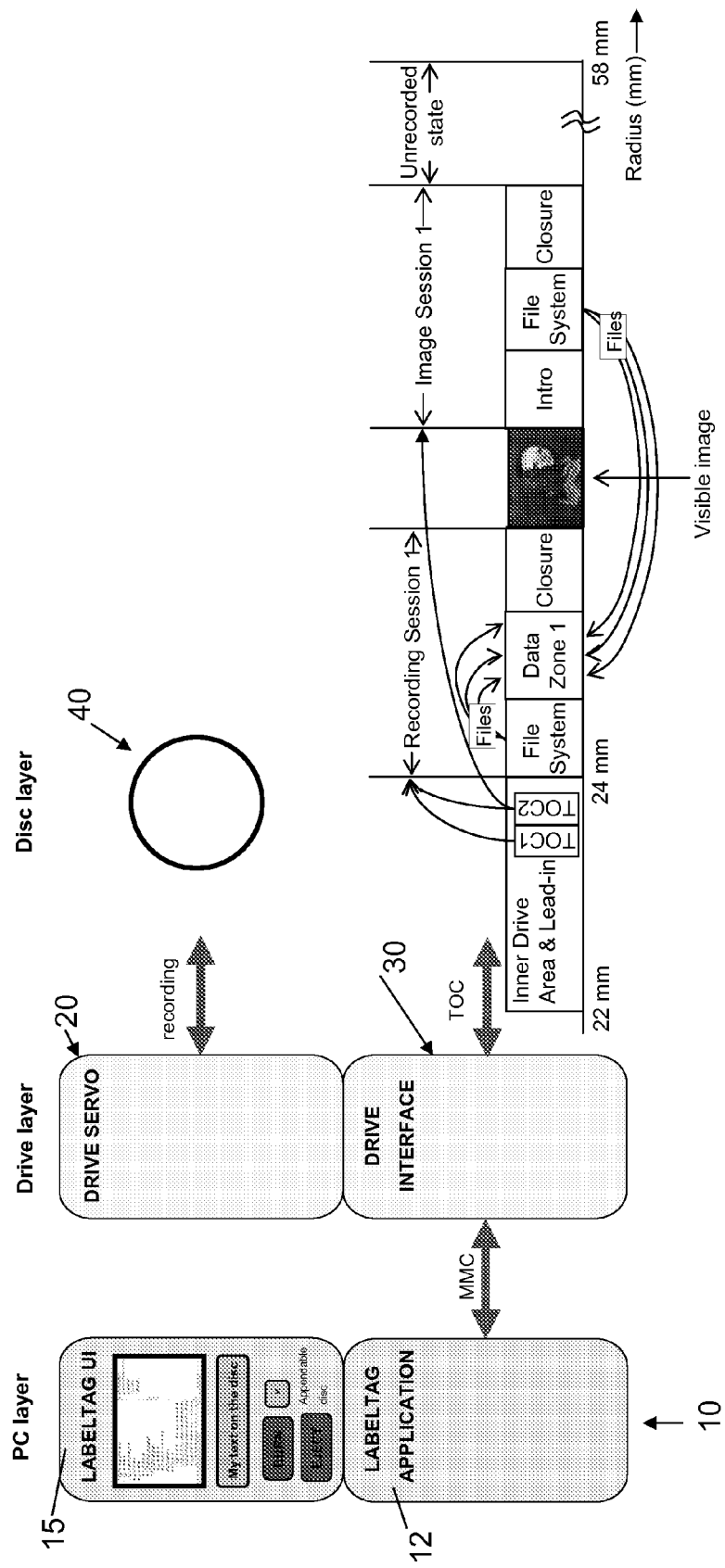
FIG. 1 shows an overview of a system for applying a visually detectable pattern at a record carrier.

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All publications, patent applications, patents, and other references mentioned herein are incorporated by reference in their entirety. In case of conflict, the present specification, including definitions, will control. In addition, the materials, methods, and examples are illustrative only and not intended to be limiting.

FIG. 1 presents an overview of a system arranged for applying a visual detectable pattern at an optical record carrier 40, e.g. a disc. At the highest level, the system comprises a host module 10 and a drive-module 20, 30. The host application 12 at the host module 10 controls the location of regular user data including the structure of a file system wherein the regular data is organized and is responsible for close and append operations of the optical record carrier. The host module 10 may further provide for a user interface 15 that facilitates the user to enter image data to be applied on the record carrier, e.g. a name or a LOGO. Alternatively the host application 12 may autonomously calculate image data to be applied at disc, for example an image that indicates the date of recording may be applied as the visually detectable pattern. In the host application 12 a bit-map representation is generated, for example from the user data provided via the user interface 15. The host then sends print commands with the pixel information of the image to the drive-module 20, 30. This aspect is described in more detail in earlier filed application P82011US00 filed as provisional application U.S. 60/954, 490 by the same Applicant. The drive-module on its turn has a drive interface part 30 and a drive servo part 20. The drive interface part 30 handles the print commands issued by the host 10 and records the regular data, including session lead in, closures, intro and lead out. The drive interface part 30 takes care of the interpretation of the pixel information and location of the image on the disc. The drive Servo part 20 finally records the pixel information on the correct location including the encoded line numbering. The drive Servo part 20 controls the record power, motor frequency, pixel frequency and channel bit frequency.

Figure 2:
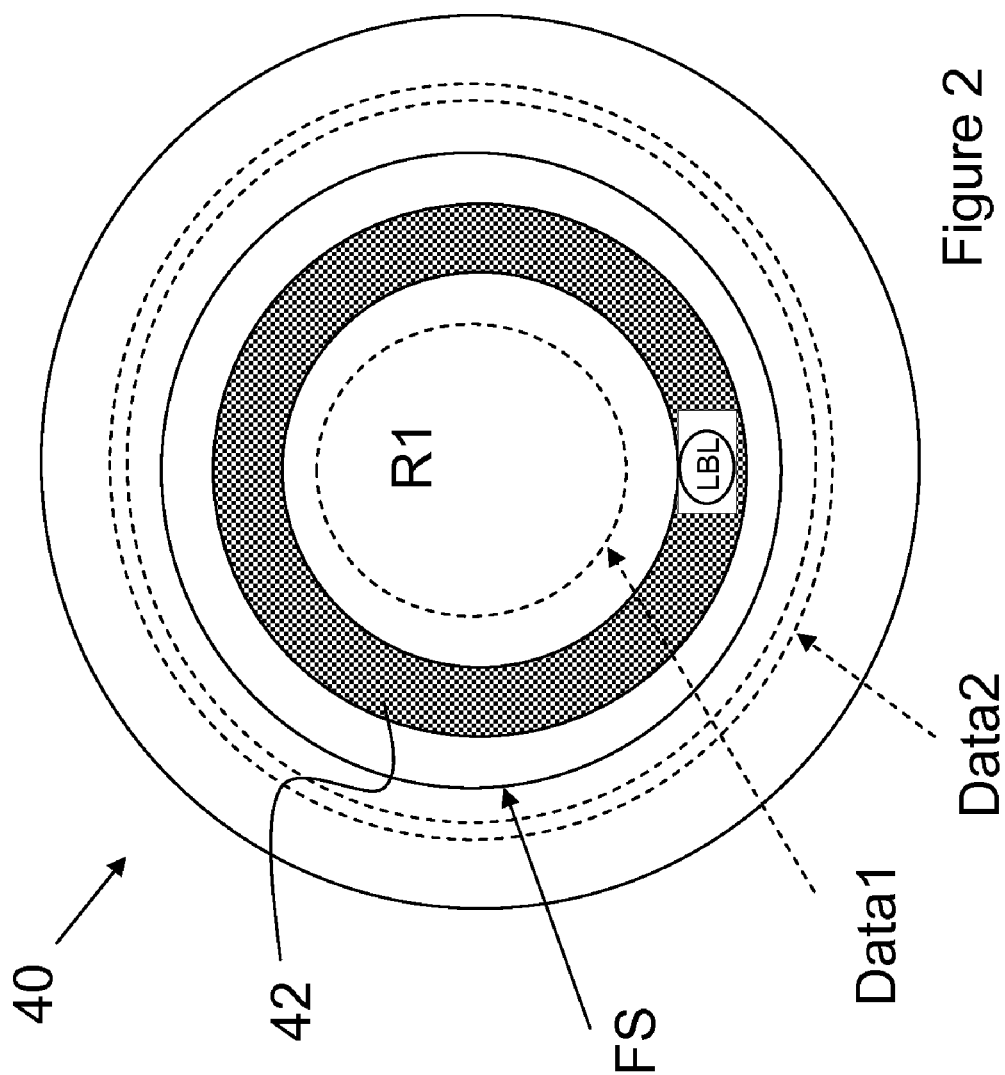
FIG. 2 shows a record carrier according to the invention with a visually detectable pattern.

FIG. 2 shows in more detail a record carrier 40 comprising a zone 42 with a visually detectable pattern LBL. In the embodiment shown the record carrier further comprises a first and a second data zone data1, data2 and a file system FS. The visually detectable pattern LBL is for example a text or an image that is indicative for the content of the disc, a date of recording, or the name of the owner.

According to a first embodiment of a record carrier of the invention, the visually detectable pattern LBL may be composed of pattern elements arranged along at least one track TR of the record carrier as shown in FIGS. 3A, 3B. For purpose of clarity the track TR is considered linear. Although in practice the track TR may be curved, the curvature is negligible at the scale of the pattern elements (e.g. in the order of μm or less). As shown in these figures the pattern elements comprise a marked zone CS11m, CS12m that has an optical property deviating from a background. The optical property of the pattern elements may be a brightness, wherein the marked zones are relatively dark as compared to the background. Alternatively the marked zones may be relatively bright as compared to the background. Alternatively the optical property may be a reflection direction or a polarization direction for example. In FIG. 3A, 3B the black zone indicates the width of the marked zone WCS11, WCS12, whereas the gray zone indicates a reference width W. FIGS. 3A, 3B respectively show a first and a second portion of the track TR. In these Figures the gray levels gray and black are merely used to compare the size of the marked zone to the reference size. In practice the marked zone may have a uniform gray level. In the portion shown in FIG. 3A, the marked zone CS12m of the pattern element CS12 has a width of WCS12 and a length of 14 length units. In the portion shown in FIG. 3B, the marked zone CS11m of the pattern element CS11 has a width of WCS11 and a length of 3 length units. The two pattern elements CS12, CS11 have a mutually different width Wm. In particular the width WCS11 of the first pattern element CS11 is smaller than a reference width W, and the width of the second pattern element WCS12 is larger than the reference width W. Accordingly a visually detectable pattern composed of this combination of pattern elements has a higher contrast. The effects of the width variation and the length variation on the apparent brightness are synergic, in that they reinforce each other.

FIGS. 4A, 4B shows another example of portions of a track TR that have different pattern elements CS11, CS21 that have a mutually different width Wm, i.e. WCS11, WCS21 respectively. A first portion of the track TR shown in FIG. 4A has pattern elements CS11, having a marked portion CS11m with width WCS11. The second portion of the track TR, shown in FIG. 4B has pattern elements CS21, having a marked portion CS21m with width WCS21. In this example the pattern elements CS11 having the relatively short marked portion having a length of 3 units have a relatively large width WCS11, larger than the reference width W. The pattern elements CS21 having the relatively long marked portion having a length of 4 units have a relatively small width WCS21, smaller than the reference width W. The combination of the pattern elements CS11, CS21 can be used to encode data. However, for the human observer regions in the visually detectable pattern having the first pattern element CS11 appear substantially the same as regions having the second pattern element CS21, as the average amount of reflected light is substantially the same, or even exactly the same if the area of the marked zone CS11m of the first pattern element CS11 is the same as the area of the marked zone CS21m of the first pattern element CS21.

It is additionally possible to control parameters of a remaining zone outside the marked zone in the pattern element. This is illustrated in FIG. 5. Therein the remaining zone CS12r of pattern element CS12 is partially marked. Preferably, the marked portion of the remaining zone has a width of at most ⅓ of the reference width so that the remaining zone can be well discriminated from the marked zone by a detector. If the width of the marked portion of the remaining zone becomes significantly larger, e.g. more than 50% of the reference width the remaining zone may be erroneously detected as part of the marked zone. Also combinations are possible. An example is schematically shown in FIG. 6. FIG. 6 shows a set of pattern elements CS11, CS21, CS12 and CS22. A first subset ST1 comprises the pattern elements CS11 and CS21, while a second subset ST2 comprises the pattern elements CS12 and CS22. Pattern elements within the same subset have at least substantially the same average reflection. Although the marked zone CS21m of the pattern element CS21 is slightly longer than the marked zone CS11m of the pattern element CS11 (4 units instead of 3 units), it is also narrower. Ideally the marked zones of CS11 and CS21 have the same surface area. Likewise, although the marked zone CS22m of pattern element CS22 is longer than that CS12m of pattern element CS12, it is also narrower. A visually detectable pattern may be provided by a pattern formed by these four pattern elements, wherein the bright areas in the visually detectable pattern are formed by the pattern elements of the first subset ST1, and the dark areas are formed by the pattern elements of the second subset ST2. The selection of a subset ST1, ST2 determines the brightness, while the selection of one of the elements from within a subset can be used to represent embedded data.

Figure 7:
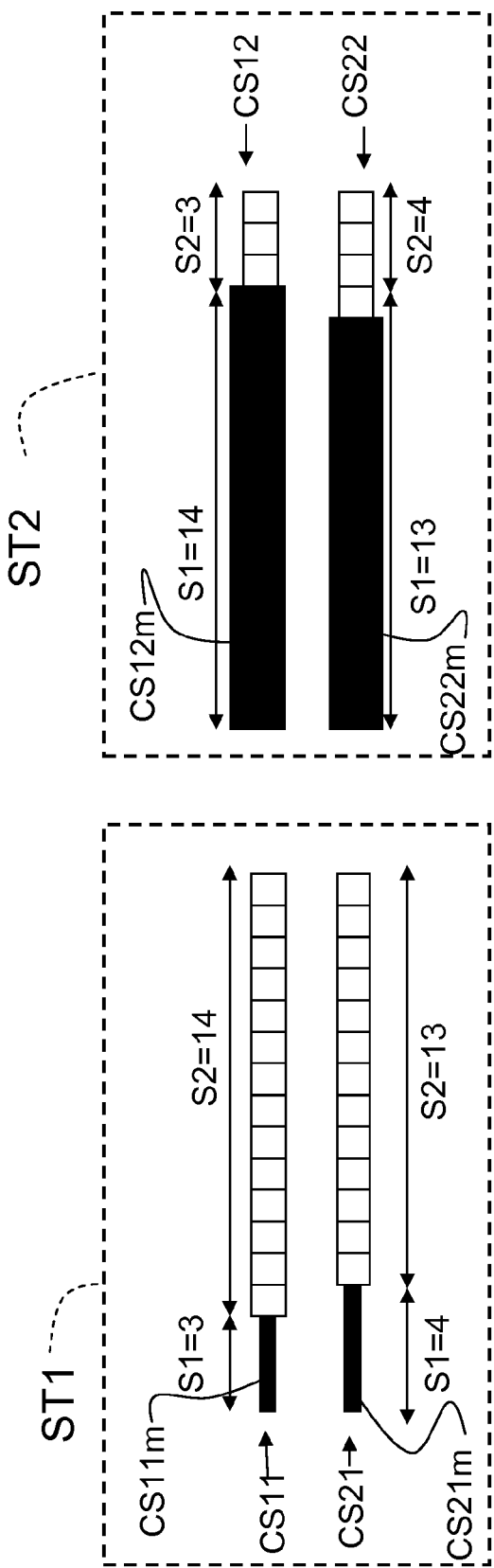
FIG. 7 shows a first and a second subset of pattern elements in a second embodiment of the record carrier.

FIG. 7 shows an example wherein the marked zones CS11m, CS22m of the pattern elements CS11, CS22 of the second subset ST2 both are relatively wide as compared to the marked zones CS11m, CS21m of the pattern elements CS11, CS21 of the first subset ST1. For example the pattern elements in the second subset ST2 have a width that is a factor 2 higher than the width of the marked zones CS11, CS21. In this way a stronger improvement in contrast is obtained than in case of the embodiment of FIG. 6. However, the contrast is data dependent. The contrast between pattern elements CS11 and CS12 is higher than the contrast between pattern elements CS21 and CS22.

Figure 8:
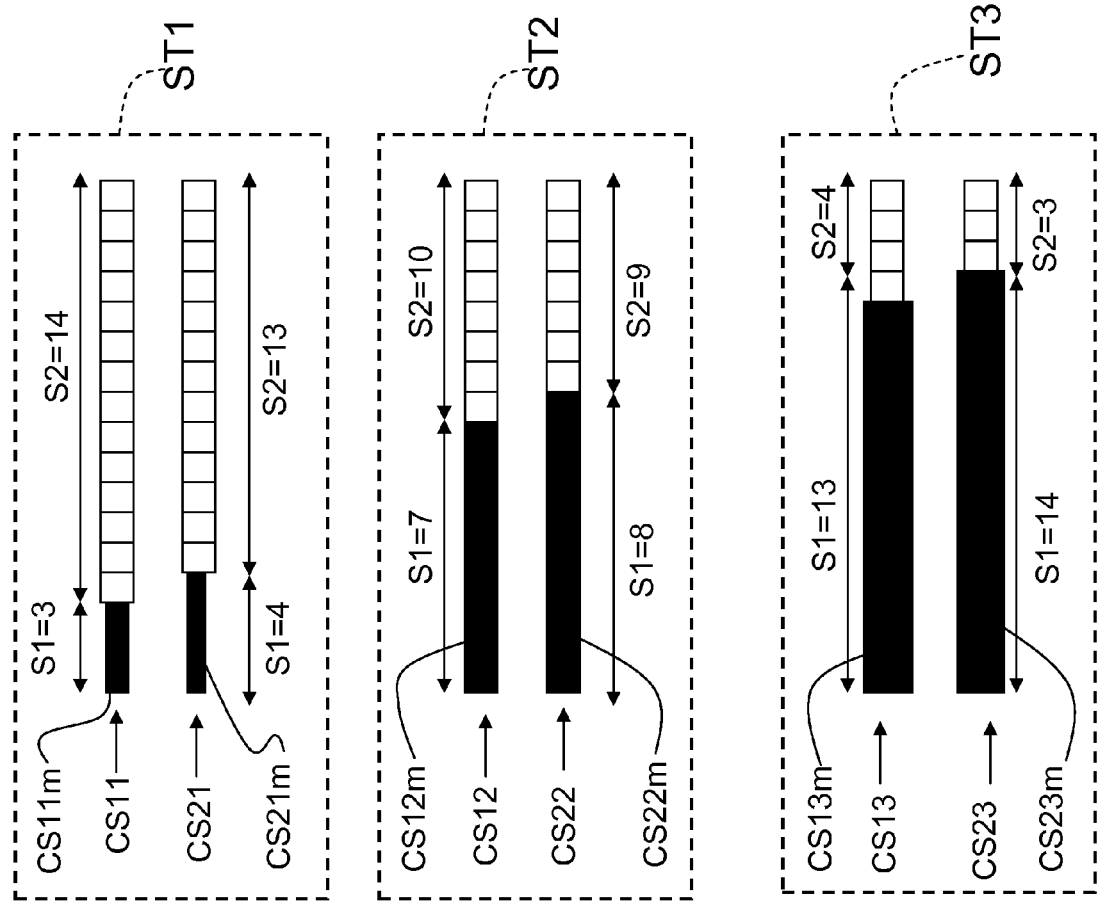
FIG. 8 shows a first, a second and a third subset of pattern elements in a third embodiment of the record carrier.

FIG. 8 shows a further example. According to an embodiment a visually detectable pattern is composed from pattern elements selected from one of the subsets ST1, ST2, ST3. Relatively dark zones are represented by pattern elements selected from subset ST1, intermediately bright zones are represented by pattern elements selected from subset ST2, and bright zones are represented by pattern elements selected from subset ST3. Subset ST1 comprises pattern elements CS11, CS21 that respectively have a marked zone CS11m with length of 3 units and a width of 80% of the reference width W, and a marked zone CS21m with length of 4 units and a width of 80% of the reference width respectively. Subset ST2 has pattern elements CS12 and CS22 respectively have a marked zone CS12m with a length of 7 units and a width equal to the reference width W and a marked zone CS22m with a length of 8 units and a width equal to the reference width W. Subset ST3 comprises pattern elements CS13, CS23 that respectively have a marked zone CS13m with length of 13 units and a width of 120% of the reference width W, and a marked zone CS23m with length of 14 units and a width of 120% of the reference width respectively.

Figure 9:
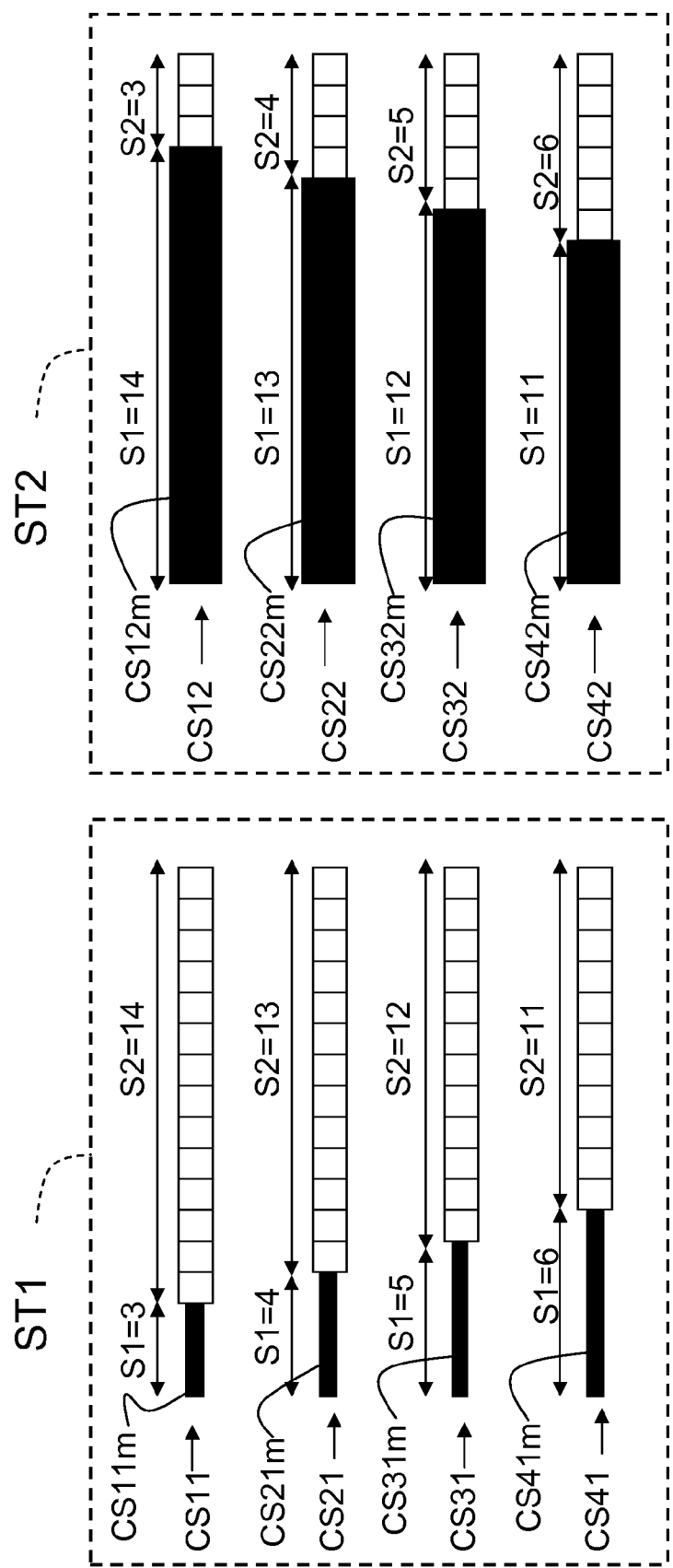
FIG. 9 shows a first and a second subset of pattern elements in a fourth embodiment of the record carrier.

FIG. 9 shows a further example. According to the embodiment shown therein a visually detectable pattern is composed from pattern elements selected from one of the subsets ST1 and ST2. Dark zones in the visually detectable pattern are represented by pattern elements selected from subset ST1, and bright zones are represented by pattern elements selected from subset ST2. The marked zones CS11m, CS21m, CS31m and CS41m of the pattern elements CS11, CS21, CS31 and CS41 in the first subset ST1 are relative short in that they respectively have a length of 3, 4, 5 and 6 units, and narrow, in that they have a width equal to 70% of the reference width W. The marked zones CS12m, CS22m, CS32m and CS42m of the pattern elements CS12, CS22, CS32 and CS42 in the second subset ST2 are relative long, in that they have a length of respectively 14, 13, 12 and 11 units and wide in that they have a width of 130% of the reference width W. Each pattern element can represent 2 bits of embedded data, as each subset from which the pattern element is selected comprises 4 pattern elements.

In the embodiments shown the pattern elements used for representing the visually detectable image have a length 17. This corresponds to the EFM+ channel code used for DVD having symbols of length 14 that are coupled by 3 merging bits. Alternatively the pattern elements may have a length corresponding to the EFM channel code for CD with runlength 14 or to the 17PP channel code used for BD for example may be used.

Alternatively another combination of pattern elements may be used, in which pattern elements have a different length. One example thereof is shown in FIG. 10. There the first pattern element CS11 and the second pattern element CS21 of the first subset ST1 have different length, 17 and 18 units respectively. Likewise, the first pattern element CS12 and the second pattern element CS22 of the second subset ST2 have different length, 17 and 18 units respectively.

Different pairs of pattern elements may have a different contrast. For example in the embodiment shown in FIG. 7, a first pair of pattern elements CS11, CS12 provides for a higher contrast than a second pair of pattern elements CS21, CS22, as the mutual difference in relative area between the marked zones is larger for the first pair than for the second pair.

Accordingly pairs of pattern elements comprising a pattern element from the first subset ST1 and the second subset ST2 can be identified, a first pair comprising primary pattern elements CS11, CS12 that have a large contrast, and a second pair of pattern elements comprising secondary pattern elements CS21, CS22 with less contrast.

According to a favourable embodiment a relatively high overall contrast of the visually detectable pattern can be obtained by a method wherein the data elements are obtained by conversion of primary data elements using a contrast enhancement code, wherein each contrast enhancement code word comprises a sequence of contrast enhancement code bits that are representative for selection of a primary or a secondary pattern element, wherein the contrast enhancement code words comprise more contrast enhancement code bits representative for a primary pattern element than contrast enhancement code bits representative for a secondary pattern element. The contrast enhancement code promotes that predominantly the primary pattern elements are selected that provide for a high contrast. Preferably the number of contrast enhancement code bits in the contrast enhancement code words representative for the first pair of pattern elements is at least 4 times as high as the number of contrast enhancement code bits in the contrast enhancement code words representative for the second pair of pattern elements.

The following tables show examples of such a contrast enhancement code. Herein a primary data element having a value in the range of 0x0 to 0xF is converted into a contrast enhancement code word, wherein each bit represents the choice for a particular pair of pattern elements. The contrast enhancement code words comprise predominantly bits "0" that are representative for the first pair of pattern elements, having the highest contrast.

The first table in FIG. 11A shows a conversion into 8-bit contrast enhancement code words.

The second table in FIG. 11B shows a conversion into 10-bit contrast enhancement code words. In this case for each code word, the number of bits "0" representative for the first pair of pattern elements CS11, CS12 is 5 times as high as the number of contrast enhancement code bits "1" in the contrast enhancement code words representative for the second pair of pattern elements CS21, CS22.

The third table in FIG. 11C shows a conversion into 16-bit contrast enhancement code words. In this case for each code word, the number of bits "0" representative for the first pair of pattern elements CS11, CS12 is 8 times as high as the number of contrast enhancement code bits "1" in the contrast enhancement code words representative for the second pair of pattern elements CS21, CS22.

In each of the tables, the contrast enhancement code words each have the same number of contrast enhancement code bits representative for the second pair of pattern elements. This has the advantage that the visually detectable pattern has a substantially constant contrast, independent of the embedded data.

In the second and the third table, for each contrast enhancement code word contrast enhancement code bits representative for the second pair of pattern elements CS21, CS22 are separated by at least one contrast enhancement code bit representative for the first pair of pattern elements CS11, CS12. In this way it is avoided that too many tracks with pattern elements of the second pair are adjacent to each other. Therewith the apparent contrast is further improved, as the second pair of pattern elements is less frequently used.

Figure 12:
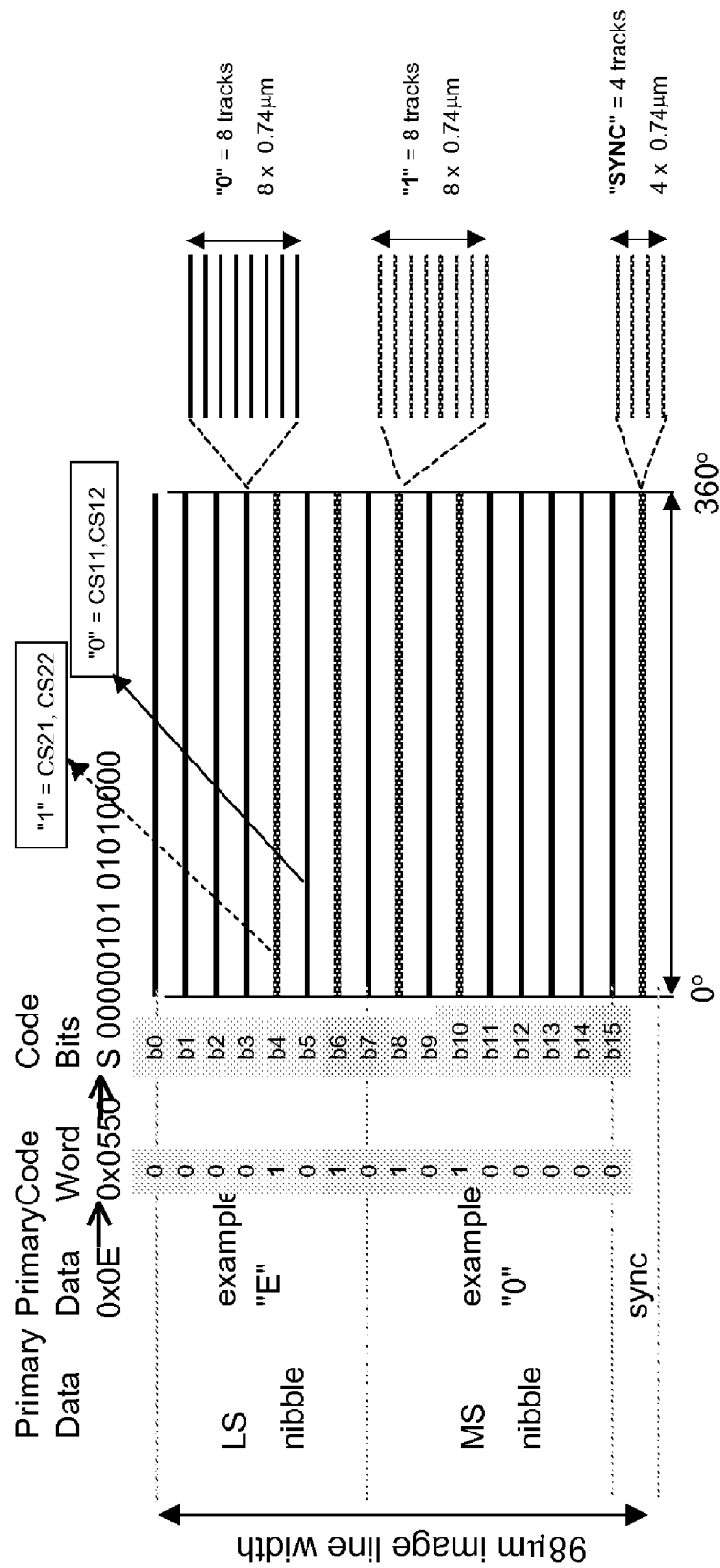
FIG. 12 shows for an embodiment in more detail how a visually detectable pattern is applied at a plurality of tracks at a record carrier.

FIG. 12 shows how a single line of the visually detectable pattern is mapped at a plurality of tracks. In this case an image line is mapped at 16 groups of subsequent tracks, wherein, in this case, each group comprises a set of 8 tracks. In this example the individual tracks have a width of 0.74 µm, and the image line has a width of 98 µm. As illustrated in FIG. 12, an 8-bit primary data word is mapped at the visually detectable image. The two 4-bit nibbles of the 8-bit primary data word (here 0x0E for example) are each converted in a 8-bit contrast enhancement code word, using the first conversion table, so that the primary data word is represented by a 16-bit contrast enhancement code. For each of the 16 subsequent groups of tracks a respective pair of pattern elements is selected to display the visually detectable pattern. For example, in the first group of tracks, the first pair of pattern elements CS11, CS12 is used and in the fifth group of tracks the second pair of pattern elements is used CS21, CS22. It is noted that the track is one winding of the spiral formed by the continuous pre-groove, as in a CD format, DVD format or BD format. Or that the track is one winding of the spiral formed by the alternating pre-groove, as is the case with land-groove formats as DVD-RAM.

Further one or more sync tracks may be included in the image line for example. The sync tracks for example comprise a sequence of pattern elements of the pair of secondary pattern elements. Alternatively a tertiary set of pattern elements that deviates from the primary and the secondary set of pattern elements may be used for this purpose, e.g. a 3T-8T/8T-3T pattern.

A further improvement of contrast can be obtained by using one of the other tables, e.g. the 4 to 10 conversion table of FIG. 11B, or the 4 to 16 conversion table of FIG. 11C.

Figure 13:
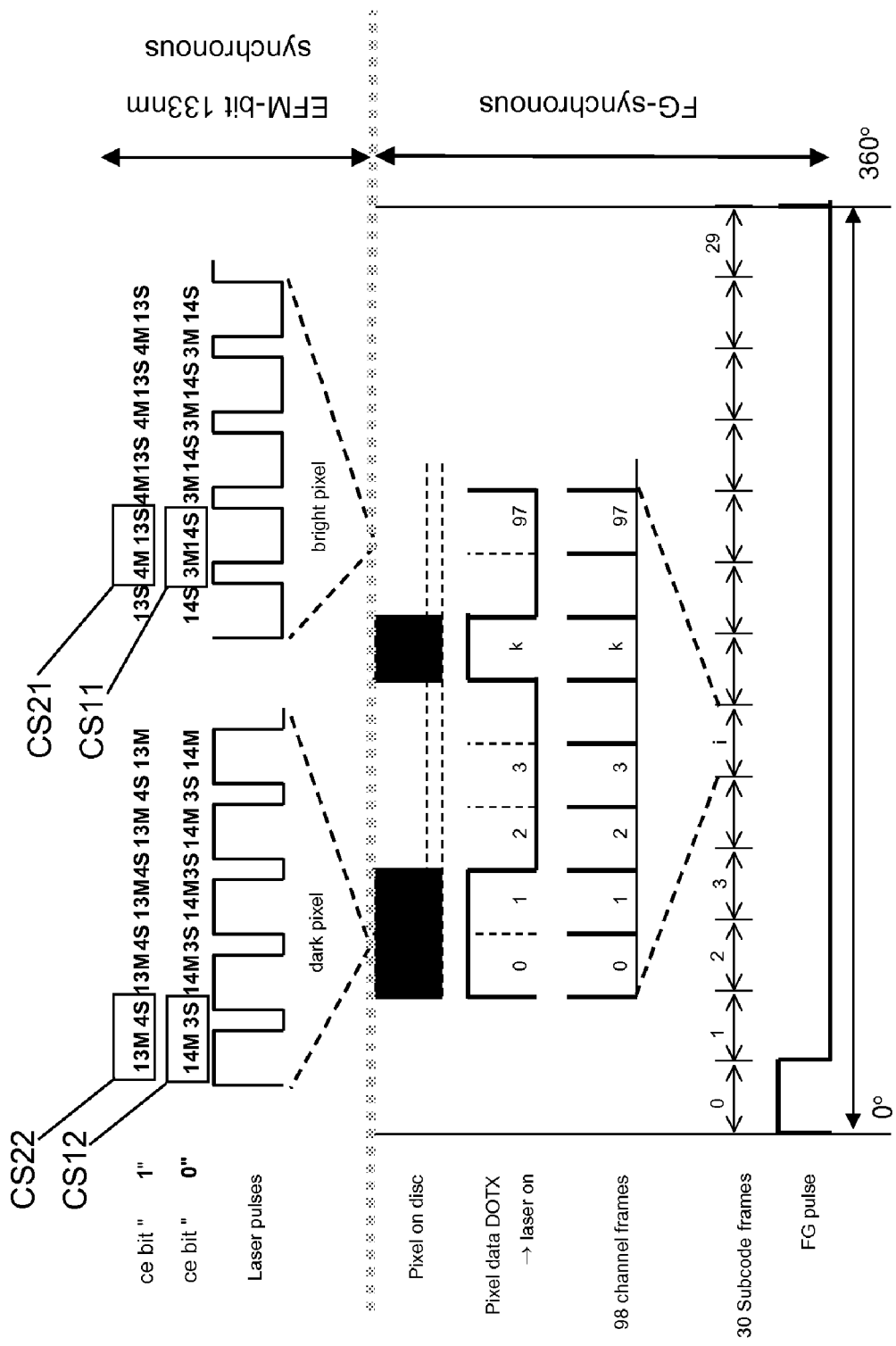
FIG. 13 shows a detail of FIG. 12.

FIG. 13 shows how in this way 2940 pixels can be encoded utilizing the CD frame encoder hardware for example. As illustrated in FIG. 13 for this example for each rotation of the disc, 30 subcode frames, each comprising 98 channels are recorded, where in each channel frame forms a pixel of the visually detectable pattern.

FIG. 13 also shows how for those tracks where the contrast enhancement code bit (ce-bit) is 0, the pixels are formed using the first pair of pattern elements, i.e. in this case CS11 to represent bright pixels and CS12 to represent dark pixels. For those tracks where the contrast enhancement code bit (ce-bit) is 1, the pixels are formed using the second pair of pattern elements, i.e. in this case CS21 to represent bright pixels and CS22 to represent dark pixels.

Figure 14:
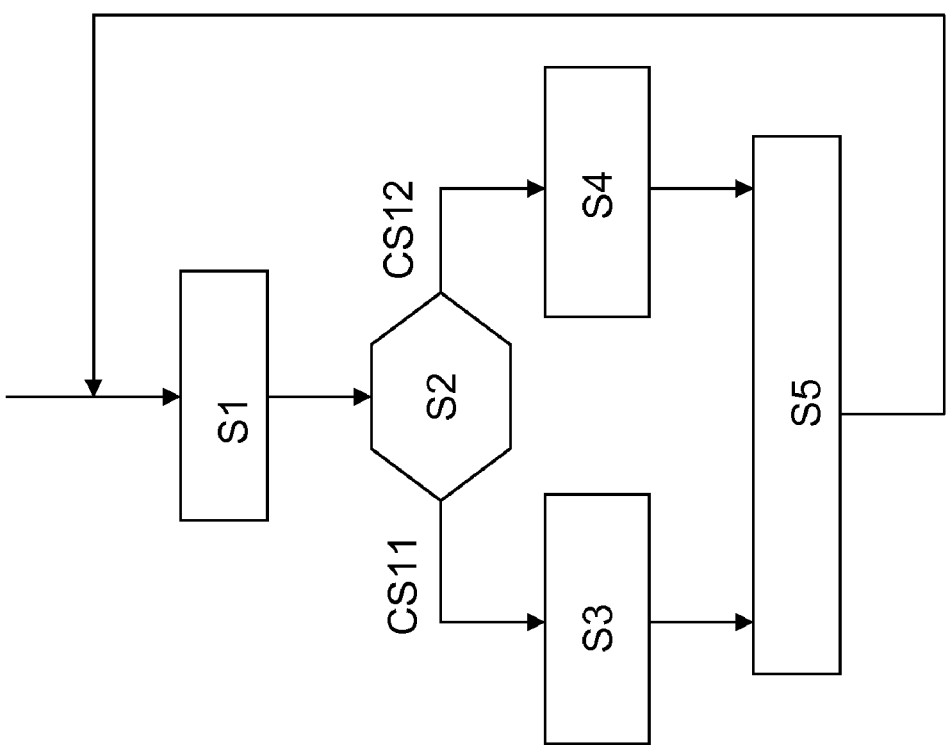
FIG. 14 shows a first embodiment of a method for applying a visually detectable pattern at a record carrier.

FIG. 14 shows a first embodiment of a method according to the invention of writing a visually detectable pattern of pattern elements at a record carrier. In step S1, an image data element is retrieved, for example from a memory or via a communication port. In step S2, on the basis of the retrieved image element, a pattern element to be written at the record carrier is selected from at least a first and a second pattern element. For example a selection is made between the pattern elements CS11 and CS12 as shown in FIG. 3A, 3B. The pattern element is selected that best represents the current gray value of the pixel of the image to be printed at the record carrier. For example in a binary image the dark pixels are represented by pattern elements CS12 and the bright pixels by pattern elements CS11.

If the first pattern element CS11 is selected, step S3 is executed, and if the second element CS12 is selected, step S4 is executed. In step S3, a radiation sequence is defined having a first, relatively short time interval tm1 of three time units and a second relatively long time-interval ts1 of fourteen time units, wherein the power for the first time interval is set at Pt1=Ppeak_3Tm1 and for the second time interval is set at Pb1=Pbottom. In step S4, a radiation sequence is defined having a first, relatively long time interval tm1 of fourteen time units and a second relatively short time interval ts2 of three time units, wherein the power for the first time interval is set at Pt2=Ppeak_14Tm1 and for the second time interval is set at Pb2=Pbottom.

In step S5, the selected pattern element is written at the record carrier by targeting a beam of radiation at the record carrier. The beam is modulated in accordance with the defined radiation sequence. This is illustrated in FIGS. 3A and 3B. As can be seen in FIG. 3A, 3B, tm1<ts1 and tm2>ts2, and at least Pt1 differs from Pt2 and/or Pb1 differs from Pb2. In this case Pt1 differs from Pt2. In this embodiment Pt1<Pt2, having the effect that relatively short marked portions are written with a relatively small width and relatively long marked portions are written with a relatively long width. After the pixel value is written, the procedure may be repeated, beginning with step S1 by retrieving a next pixel value It is noted that each pixel of the visually detectable pattern may be represented by one ore more pattern elements depending on a desired resolution of the visually detectable pattern. If more than one pattern element is used to represent a pixel, the same pattern element may be repeated. Alternatively a combination of mutually different pattern elements may be used to achieve a desired gray value, for example a pixel may comprise a sequence of alternately pattern element CS11 and CS12 to achieve a gray value intermediate the gray value of a pixel with only the pattern elements CS11 and a pixel with only the pattern elements CS12. When writing a selected pattern element at a different speed than a reference speed, the length and the power level may be adapted in a way known to the skilled person in order to achieve the same desired shape of the mark at the different speed as at the reference speed. For example, if the speed is a factor higher than the reference speed, the time intervals in the radiation sequence for said pattern element should be shortened with that factor. At the same time the radiation power should be increased with a power increase factor to achieve the same effect on the medium of the record carrier. The power increase factor can be determined by simple experiments.

Figure 15:
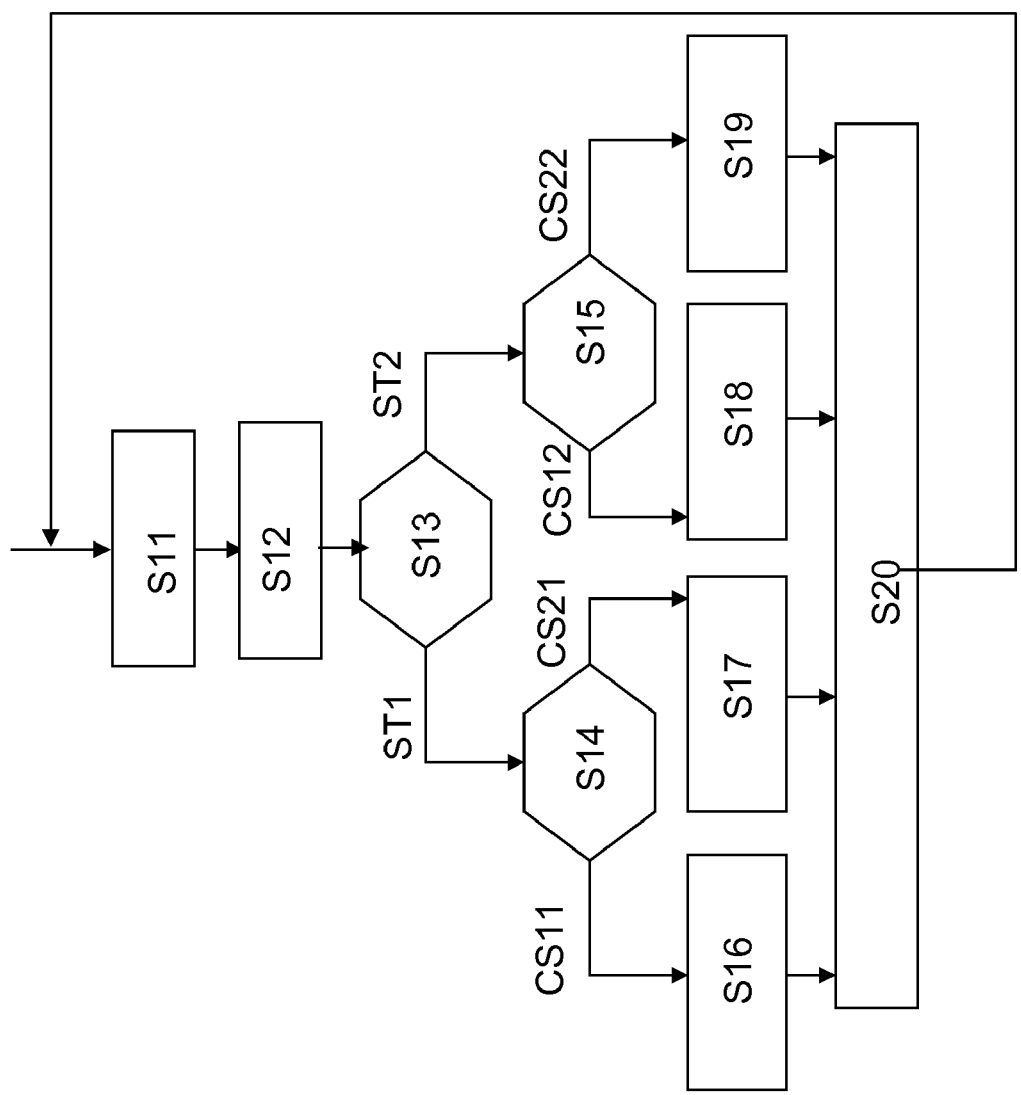
FIG. 15 shows a second embodiment of a method for applying a visually detectable pattern at a record carrier.

FIG. 15 shows a second embodiment of the method of writing according to the invention, which can be used to write the combination of pattern elements shown in FIG. 6. In step S11 thereof, an image data element is retrieved, for example from a memory or via a communication port. In step S12 a data element to be embedded is retrieved. This may be retrieved from a memory, or from a communication port. The data element may be achieved by encoding primary data, for example using one of the tables 11A, 11B and 11C.

On the basis of the value of the image data element, it is determined in step S13 whether the pattern element should be selected from the first or the second subset ST1, ST2. If the subset ST1 is selected, a pattern element CS11 or CS21 is selected from this subset ST1 in step S14 depending on the value of the data element to be embedded. If the subset ST2 is selected, a pattern element CS12 or CS22 is selected in step S15 depending on the data value to be embedded. Depending on the outcome of the selection steps, a radiation sequence is defined according to one of the steps S16-S19 as indicated in the following table.

| Step | Tm | Pm | Ts | Ps |
|------|------|------|------|------|
| S16 | Tm11 = 3 | Pm11 | Ts11 = 14 | Ps11 |
| S17 | Tm21 = 4 | Pm21 | Ts21 = 13 | Ps21 |
| S18 | Tm12 = 14 | Pm12 | Ts12 = 3 | Ps12 |
| S19 | Tm22 = 13 | Pm22 | Ts22 = 4 | Ps22 |

Therein Tm is the duration of a first time interval in time units, wherein the radiation power has the value Pm and Ts is the duration of a second time interval in time units, wherein the radiation power has the value Ps. In this case the values Ps11, Ps21, Ps12 and Ps22 are equal to a bottom power value, for example a value of 0. The values Pm11 and Pm12 are equal to a reference power value Pref and the values Pm21 and Pm22 respectively are lower than and higher than the reference value. By way of example, defining a relative power of 100% as the reference value Pref, the values for the values for Pm11, Pm21, Pm12, Pm22 are set at:

Pm11, Pm12=100%
Pm21=95%, Pm22=105%

In another embodiment both Pm11 and Pm21 are set at a value lower than the reference power value and Pm12 and Pm22 are set at a value higher than the reference power value so as to obtain the pattern elements shown in FIG. 7. Likewise the bottom value of the radiation power may be changed, to change the average reflectivity of the remaining portion of a pattern element, for example as shown for a pattern element CS12 in FIG. 5.

By way of example, defining a relative power of 100% as the reference value

Pref, the values for the values for Pm11, Pm21 and Pm12, Pm22 are set at:

Pm11, Pm21=90%
Pm12, Pm22=105%

It is noted that the order in which the selection of the pattern element is made is not relevant. First a subset of pattern elements may be selected on the basis of the image data, and subsequently a selection may be made from this subset on the basis of the at least data element to be embedded. Alternatively first a selection may be made on the basis of the data to be embedded and subsequently a selection may be made on the basis of the image data.

FIG. 16 again shows the system of FIG. 1, here with the drive-module 20 in more detail. As shown therein the drive 20 comprises a read/write head 21 to read optically detectable information from the record carrier 40 and to provide an output signal representative for the information read from the record carrier 40 to an RF processing circuit 26 and/or to write optically detectable information at the record carrier 40. The read/write head 21 forms a device for writing pattern elements at the record carrier 40, and comprises for example a device for projecting a radiation beam modulated by a control signal at the record carrier 40. However other means may be used to apply an optically detectable pattern at the record carrier 40.

The read/write head 21 is movable relative to the record carrier 40 by means comprising a spindle motor 22 for rotating the record carrier 40 and further means, e.g. a slide and a radial actuator (not shown) for radially displacing the read/write head 21 relative to the record carrier 40. The relative movement of the read/write head 21 with respect to the record carrier 40 is controlled by a servo circuit 23. The RF processing circuit 26 decomposes the signal obtained from the read/write head 21 into a first output signal that is provided to a decoder circuit 27, which decodes the first output signal into a digital signal representative for the data stored on the record carrier 40. The RF processing circuit 26 provides a second output signal to an address detection circuit 29 that determines the address at the record carrier 40 that is currently accessed by the read/write head 21. The data obtained by decoder circuit 27 and the address determined by address detection circuit 29 is provided to general controller 30. With this information the controller 30 controls the servo circuit 23.

Regular data is written on the record carrier 40 by an encoder 31, 32, write strategy unit 33, a driver 24 and the read/write head 21. The encoding may include an error protection encoding 31 (e.g. Reed-Solomon) and a channel encoding 32 which is dependent on the medium used for the record carrier 40. (e.g. an EFM coding for CD, EFM+ for DVD and 17PP for BD). The encoded signal is provided to the write strategy unit 33 that calculates a required modulation of a signal to be sent to the read/write head in order to optimally represent the encoded signal. This is dependent on the type of the record carrier 40 used, e.g. whether the record carrier 40 comprises an active layer on the basis of a phase change material, a dye etc.

The driver 24 converts the output signal into a signal suitable to drive a write facility of the read/write head. Usually the write facility comprises a laser and a lens system for providing a focused beam on the record carrier 40. The actual power applied to the write facility is further regulated by a laser power controller 25. The laser power controller 25 monitors the intensity of the laser beam in response to the signal provided by the driver 24 and adjusts the driver 24 to compensate for temperature changes and temporal deterioration of the laser in the read/write head.

The components in the drive 20 forming the facility for physically mapping at least one embedded data element as a pattern element onto the record carrier 40 may be substantially the same as those used for recording regular machine-readable data. As for the machine readable data the visible pattern is generated at the recording layer 41 of the record carrier 40 by modulating an intensity of the laser beam from the read/write head 21 while providing a relative displacement between the read/write head 21 and the record carrier 40. Likewise the image data represented at the record carrier 40 and, optionally, one or more data-elements embedded therein are written as pattern elements at the record carrier 40. Preferably the encoder 32 is reused for generating the sequence of pattern elements to be written, so that no additional hardware is required. Alternatively a different encoder may be used for this purpose to have more flexibility. According to the present invention the apparatus comprises a selection module 36 for selecting a pattern element SC on the basis of the image data ID, and the optional data element ED to be embedded.

FIG. 17 shows a first embodiment of the selection module that may select a pattern element SC, given an embedded data element ED, an image data element ID and a set of pattern elements, for example the pattern elements shown in FIG. 6 or 7. The selection module shown therein comprises a set of storage elements that comprise a set of control data Tm, Pm, Ts, Ps as specified in the table above, for the pattern elements CS11, CS21, CS12, CS22 from which a selection can be made. A first multiplexer MX1 is coupled to a pair of storage elements comprising the control data for the pattern elements of the first subset ST1 and a second multiplexer MX2 is coupled to a pair of storage elements comprising the control data for the pattern elements of the second subset ST2. A third multiplexer MX3 is coupled to the outputs of the first and the second multiplexer MX1, MX2. The embedded data element ED may be for example a bit of a primary data element, but it may alternatively be a bit of a contrast enhancement codeword that is derived from the primary data element, as indicated by the dashed box CEC representing a contrast enhancement code module. The contrast enhancement code module may for example apply a conversion table according to FIG. 11A, 11B or 11C. The image data element ID may be a bit that indicates whether the gray value to be mapped in the visually detectable pattern is higher or lower than a threshold value. On the basis of the embedded data element ED, the multiplexers MX1, MX2 respectively select data representative for a pattern element from the first and the second subset ST1, ST2. On the basis of the image data element ID the third multiplexer MX3 selects one of the sets of control data from one of the multiplexers MX1, MX2, and offers the selected control data SC at its output. The selected control data may control the driver 24 immediately. Alternatively the selection module may provide an indication to the channel encoder 32, wherein the latter generates the pattern element indicated by the selection module 36.

An alternative selection module is shown in FIG. 18. Therein the selection module comprises a lookup table, for example in the form of a ROM having stored therein the sets of control data Tm, Pm, Ts, Ps related to each pattern element, for example the pattern elements according to the embodiment of FIG. 6 or 7. The ROM is addressed by a first and a second most significant address line with the image data ID1, ID2 and by a third, least significant address line with the embedded data ED.

Figure 16:
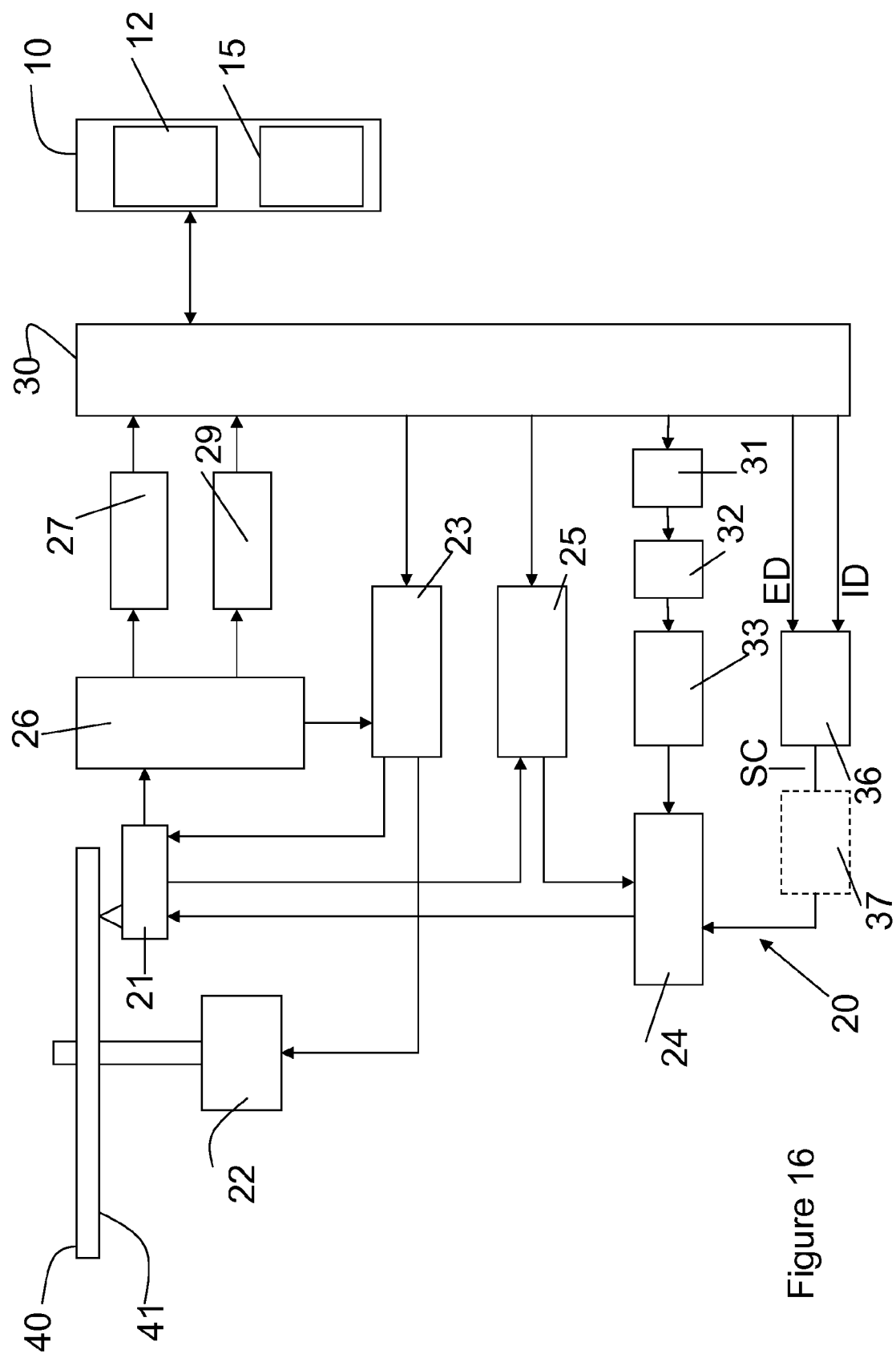
FIG. 16 shows an apparatus according to the invention for applying a visually detectable pattern at a record carrier.

The apparatus shown in FIG. 16 may have an auto-pattern generator 37 indicated in dashed form that generates the desired pattern as a function of the pattern element provided by the pattern element selection module.

In the examples presented above, the present invention is presented in particular for disc-shaped optical record carriers wherein the optical record carrier is scanned during writing and reading by the combination of a rotating movement of the record carrier and a radial movement of the read head. The invention is however equally applicable to other types of optical record carriers, e.g. card-shaped and a relative movement between the read/write-head and the record carrier may be realized in any other way, for example by an XY-table that moves the read/write-head or the record carrier.

It is noted that data and signal processing facilities, such as data encoding, data decoding, controlling a power of a radiation beam, controlling a relative movement between a targeted spot of radiation and a record carrier may be formed by dedicated hardware, but may alternatively be formed by a suitably programmed general purpose processor or a combination of both. A single processor may perform various functions.

In the claims the word "comprising" does not exclude other elements or steps, and the indefinite article "a" or "an" does not exclude a plurality. A single component or other unit may fulfil the functions of several items recited in the claims. The mere fact that certain measures are recited in mutually different claims does not indicate that a combination of these measures cannot be used to advantage.

Any reference signs in the claims should not be construed as limiting the scope.

The invention claimed is:

1. A method of writing a visually detectable pattern of pattern elements at a record carrier by targeting a modulated beam of radiation at the record carrier, comprising the step of selecting at least one pattern element from at least a first and a second pattern element, and writing the selected pattern element at the record carrier, wherein if the first pattern element is selected, the first pattern element is written with a first top radiation power Pt1 during a first relatively short time interval tm1 and with a first bottom radiation power Pb1 during a first relatively long time interval ts1, and if the second pattern element is selected, the second pattern element is written with a second top radiation power Pt2 during a second relatively long time interval tm2 and with a second bottom radiation power Pb2 during a second relatively short time interval ts2, wherein, when the first and the second pattern element are written at the same speed Pt1>Pb1, Pt2>Pb2, tm1<ts1 and tm2>ts2, and at least Pt1 differs from Pt2 and/or Pb1 differs from Pb2.

2. A method according to claim 1, wherein the step of selecting is based on the image data to be represented as the visually detectable pattern and wherein Pt1<Pt2 and/or Pb1<Pb2.

3. A method according to claim 1, wherein the step of selecting is based on a value of additional data to be embedded in the visually detectable pattern and wherein Pt1>Pt2 and/or Pb1>Pb2.

4. A method according to claim 1 or 2, wherein at least one data element is embedded in the visually detectable pattern, comprising the step of selecting the first pattern element from a first subset and the second pattern element from a second subset, wherein the selection of a pattern element from a subset is based on the at least one data element to be embedded, wherein the subsets each comprise a primary pattern element and a secondary pattern element, and wherein a visual difference between the primary pattern element is greater than a visual difference between the secondary pattern element, wherein the at least one data element is obtained by conversion of a primary data element using a contrast enhancement code, wherein each contrast enhancement code word comprises a sequence of contrast enhancement code bits that are representative for selection of the primary or a secondary pattern element, wherein the contrast enhancement code words comprise more contrast enhancement code bits representative for the primary pattern element than contrast enhancement code bits representative for the secondary pattern element.

5. An apparatus for writing a visually detectable pattern of pattern elements at a record carrier comprising a facility for targeting a beam of radiation at a spot at a surface of the record carrier, a facility for causing a relative movement of the spot with respect to the surface of the record carrier, and a facility for controlling a power of the beam of radiation, comprising a selection facility for selecting a pattern element to be written from at least a first and a second pattern element, wherein the apparatus is arranged to write the first pattern element at a reference speed with a first top radiation power Pt1 during a first relatively short time interval tm1 and with a first bottom radiation power Pb1 during a first relatively long time interval ts1, and is arranged to write the second pattern element at the reference speed with a second top radiation power Pt2 during a second relatively long time interval tm2 and with a second bottom radiation power Pb2 during a second relatively short time interval ts2, wherein Pt1>Pb1, Pt2>Pb2, tm1<ts1 and tm2>ts2, and wherein at least Pt1 differs from Pt2 and/or Pb1 differs from Pb2.

6. An apparatus according to claim 5, wherein the selection facility bases the selection on the image data to be represented as the visually detectable pattern and wherein Pt1<Pt2 and/or Pb1<Pb2.

7. An apparatus according to claim 5, wherein the selection facility bases the selection on a value of additional data to be embedded in the visually detectable pattern and wherein Pt1>Pt2 and/or Pb1>Pb2.

8. An apparatus according to claim 5 or 6, wherein at least one data element is embedded in the visually detectable pattern, comprising the step of selecting the first pattern element from a first subset and the second pattern element from a second subset, wherein the selection of a pattern element from a subset is based on the at least one data element to be embedded, wherein the subsets each comprise a primary pattern element and a secondary pattern element, and wherein a visual difference between the primary pattern element is greater than a visual difference between the secondary pattern element, wherein the at least one data element is obtained by conversion of the primary data element using a contrast enhancement code, wherein each contrast enhancement code word comprises a sequence of contrast enhancement code bits that are representative for selection of the primary or a secondary pattern element, wherein the contrast enhancement code words comprise more contrast enhancement code bits representative for the primary pattern element than contrast enhancement code bits representative for the secondary pattern element.

\* \* \* \* \*